US012540720B2

(12) United States Patent
Lu et al.

(10) Patent No.: US 12,540,720 B2
(45) Date of Patent: Feb. 3, 2026

(54) LUMINAIRE WITH SEAMLESS SPLICING FUNCTION

(71) Applicant: Xiamen PVTECH Co., Ltd., Fujian (CN)

(72) Inventors: Fuxing Lu, Fujian (CN); Weibiao Zhong, Fujian (CN)

(73) Assignee: Xiamen PVTECH Co., Ltd., Xiamen (CN)

( * ) Notice: Subject to any disclaimer, the term of this patent is extended or adjusted under 35 U.S.C. 154(b) by 0 days.

(21) Appl. No.: 18/773,532

(22) Filed: Jul. 15, 2024

(65) Prior Publication Data

US 2025/0102134 A1 Mar. 27, 2025

(30) Foreign Application Priority Data

Sep. 27, 2023 (CN) ........................ 202311265291.2

(51) Int. Cl.

| | |
|---|---|
| ***F21V 17/06*** | (2006.01) |
| ***F21S 8/04*** | (2006.01) |
| ***F21S 8/06*** | (2006.01) |
| ***F21V 3/02*** | (2006.01) |
| ***F21V 17/16*** | (2006.01) |
| ***F21V 31/00*** | (2006.01) |

(52) U.S. Cl.

CPC .............. *F21V 17/06* (2013.01); *F21S 8/043* (2013.01); *F21S 8/061* (2013.01); *F21V 3/02* (2013.01); *F21V 17/16* (2013.01); *F21V 31/005* (2013.01)

(58) Field of Classification Search

CPC ...... F21V 15/0153; F21V 23/06; F21V 7/005; F21V 17/00; F21V 31/00; F21V 15/015; F21S 4/20; F21S 8/00; F25D 27/00; F21K 9/272

See application file for complete search history.

(56) References Cited

U.S. PATENT DOCUMENTS

| | | | | |
|---|---|---|---|---|
| 8,313,212 B1 * | 11/2012 | Mayer | F21S 4/28 | 362/225 |
| 8,545,045 B2 * | 10/2013 | Tress | F21V 21/005 | 362/225 |
| 2006/0009071 A1 * | 1/2006 | Laukhuf | H01R 31/06 | 439/502 |

(Continued)

FOREIGN PATENT DOCUMENTS

| | | | | |
|---|---|---|---|---|
| CN | 112533747 A * | 3/2021 | B29C 48/022 |
| DE | 10100877 A1 * | 1/2002 | F21S 4/20 |
| JP | 4038994 B2 * | 1/2008 | |

*Primary Examiner* — Fatima N Farokhrooz

(74) *Attorney, Agent, or Firm* — Bruce Stone LLP; Joseph A. Bruce

(57) ABSTRACT

A luminaire with seamless splicing function includes a first lamp body and an end cap. The first lamp body has two joining portions disposed at the two sides thereof respectively. The end cap is combined with one of the joining portions and is a streamlined structure. The end cap has a curved side tip, a curved bottom tip and two side walls. The two sides walls are disposed at the two sides of the curved side tip and extend to the curved bottom tip. The two side walls are curved, and the curved side tip, the curved bottom tip and the two side walls are integrally formed. The streamlined structure of the end cap makes the shape thereof smooth in order to facilitate the smooth flow of air in cleanrooms and eliminate dust.

4 Claims, 16 Drawing Sheets

(56) References Cited

U.S. PATENT DOCUMENTS

| | | | | |
|---|---|---|---|---|
| 2007/0127244 | A1* | 6/2007 | Cunius .................. | F21V 17/107 362/260 |
| 2015/0200490 | A1* | 7/2015 | Elia ......................... | F21S 8/085 439/682 |
| 2015/0338068 | A1* | 11/2015 | Bolscher ................. | F21V 19/04 29/825 |
| 2018/0003351 | A1* | 1/2018 | Van Winkle .......... | F21V 23/001 |
| 2023/0272891 | A1* | 8/2023 | Ji .......................... | F21V 15/015 362/249.02 |

* cited by examiner

LUMINAIRE WITH SEAMLESS SPLICING FUNCTION

BACKGROUND OF THE INVENTION

1. Field of the Invention

The present invention relates to a luminaire, in particular to a luminaire with seamless splicing function.

2. Description of the Prior Art

With the rapid development of modern production technology, clean production environments have become increasingly important, and the requirements for factory lighting have become more stringent. These requirements are partly reflected in GMP regulations and industrial lighting standards, but more often they manifest as the demands of production processes on the lighting environment. In general, these requirements include the functionality of the lighting, the reliability of the luminaires, their compatibility with the building and HVAC systems, light quality, photobiological safety, and the suitability of the luminaires for special environments.

High-tech manufacturing processes need to be carried out in cleanrooms, and cleanroom technology is based on air filtration. Different levels of cleanrooms require different airflow organization methods and different specifications of air filters. Therefore, when designing lighting for cleanrooms, it is necessary to consider that the appearance and structure of the HVAC systems meet the requirements of the cleanroom.

SUMMARY OF THE INVENTION

One embodiment of the present invention provides a luminaire with seamless splicing function, which includes a first lamp body and an end cap. The first lamp body has two joining portions disposed at the two sides thereof respectively. The end cap is combined with one of the joining portions and is a streamlined structure. The end cap has a curved side tip, a curved bottom tip and two side walls. The two sides walls are disposed at the two sides of the curved side tip and extend to the curved bottom tip. The two side walls are curved, and the curved side tip, the curved bottom tip and the two side walls are integrally formed.

In one embodiment, the first lamp body includes a support portion. The light source board is disposed on the support portion and a light cover covers the light source board. The jointing portion is a flat plate. The shape of the jointing portion matches the first lamp body and the light cover in order to cover one side of the first lamp body and one side of the light cover.

In one embodiment, the end cap has a cavity and a partition disposed inside the cavity. The partition divides the cavity into a wiring space and an accommodating space, and the joining portion is disposed in the accommodating space.

In one embodiment, the first width of the curved bottom tip of the end cap is less than the second width of the top of the end cap.

In one embodiment, the height-to-width ratio of the first lamp body is 10:6.

In one embodiment, the curved side tip is an inclined structure extending outwardly and obliquely from the curved bottom tip.

In one embodiment, the luminaire further includes another end cap combined with the other of the joining portions.

In one embodiment, each of the two sides of the joining part is provided with a buckle slot, and the inner side of each of the two side walls of the end cap is provided with a buckle block. The buckle blocks are engaged with the buckle slots respectively.

In one embodiment, the luminaire further includes a second lamp body, and the two sides of the second lamp body are provided with two connecting portions respectively. One of the connecting portions is connected to the other of the joining portions, and the first lamp body is combined with the second lamp body via a connecting element.

In one embodiment, the luminaire further includes a clip having a buckle sheet and a locking element disposed on the buckle sheet. The top of the first lamp body has a groove, and the buckle sheet is engaged with the groove.

Another embodiment of the present invention further provides a luminaire with seamless splicing function, which includes a lamp body, a light cover, a light source board, two end caps, and two decorative covers. The light source board is disposed the lamp body. The light cover is disposed on the lamp body and covers the light source board. The two end caps are disposed at the two ends of the lamp body. Each end cap has an end cap body, a protruding portion, and a plurality of elastic metal sheets. The protruding portion has a recess and is connected to the end cap body. The height of the protruding portion is lower than that of the end cap body, such that an accommodating space is formed between one end of the protruding portion and the end cap body. The elastic metal sheets are disposed inside the protruding portion to electrically connect to the light source board. The two decorative covers correspond to the two end caps respectively. Each decorative cover has a head portion and a columnar portion, with the columnar portion inserted into the recess of the corresponding end cap, and the head part filling the accommodating space of the corresponding end cap.

In one embodiment, the protruding portion of each end cap has an accommodating groove with a plurality of connection holes.

In one embodiment, the luminaire further includes an electrical connection cover, which has a cover body, a plurality of first metal pins, and a plurality of second metal pins. The first metal pins are disposed at one end of the surface of the cover body. The second metal pins are disposed at the other end of the surface of the cover body and are electrically connected to the first metal pins. When the decorative cover on either end cap is removed, the first metal pins are inserted into the connection holes of the end cap to electrically connect with the elastic metal sheets of the end cap, while the second metal pins connect to another luminaire.

In one embodiment, the electrical connection cover also includes a first protruding block and a second protruding block. The first protruding block is disposed at one end of the cover body's surface, while the second protruding block is disposed at the other end of the cover body's surface. The first metal pins are disposed on the first protruding block, and the second metal pins are disposed on the second protruding block.

In one embodiment, the electrical connection cover further includes a first waterproof ring and a second waterproof ring. The first waterproof ring is sleeved on the first protruding block, and the second waterproof ring is sleeved on the second protruding block.

In one embodiment, the electrical connection cover also includes a plurality of hook portions, which are disposed on the surface of the cover body.

In one embodiment, the hook portion are disposed between the first metal pins and the second metal pins.

In one embodiment, the luminaire further includes a plurality of hanging ropes, with one end of each hanging rope connected to the lamp body and the other end fixed to the ceiling.

In one embodiment, the lamp also includes a power module, which is disposed inside the lamp body and electrically connected to the light source board.

In one embodiment, the lamp also includes a power cable. The power module is connected to an external power source via the power cable.

Through the above structural design, two luminaires can achieve seamless splicing, ensuring no gaps at the joint and maintaining continuous illumination. Additionally, the end caps feature a streamlined design, making the shape smooth and facilitating the smooth flow of air in cleanrooms, eliminating dust.

Moreover, the first protruding block and first waterproof ring of the electrical connection cover can fill the accommodating groove of the corresponding end cap, while the second protruding block and second waterproof ring can also fill the accommodating groove of the corresponding end cap. The elastic metal sheets inside the protruding portions of each end cap significantly enhance the waterproof performance of the luminaire.

Further scope of applicability of the present application will become more apparent from the detailed description given hereinafter. However, it should be understood that the detailed description and specific examples, while indicating exemplary embodiments of the present invention, are given by way of illustration only, since various changes and modifications within the spirit and scope of the present invention will become apparent to those skilled in the art from this detailed description.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The present invention will become more fully understood from the detailed description given herein below and the accompanying drawings which are given by way of illustration only, and thus are not limitative of the present invention and wherein:

FIG. 5 illustrates the state of the end cap of the luminaire being removed.

DETAILED DESCRIPTION

Figure 1:
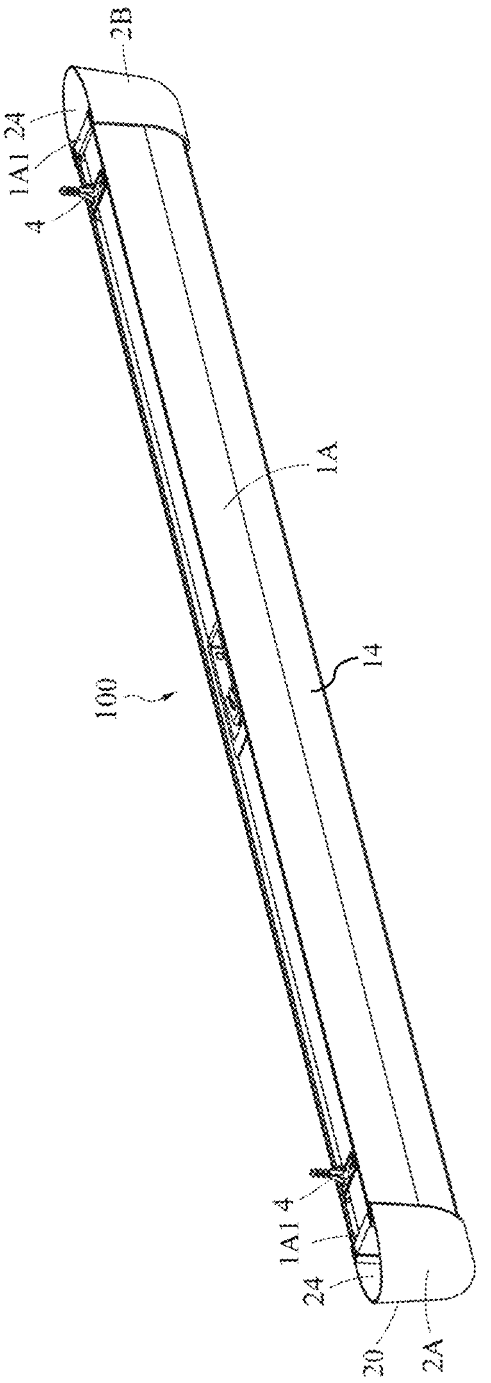
FIG. 1 is the perspective view of the luminaire with seamless splicing function in accordance with one embodiment of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing. It should be understood that, when it is described that an element is “coupled” or “connected” to another element, the element may be “directly coupled” or “directly connected” to the other element or “coupled” or “connected” to the other element through a third element. In contrast, it should be understood that, when it is described that an element is “directly coupled” or “directly connected” to another element, there are no intervening elements.

Please refer to FIG. 1, which is the perspective view of the luminaire with seamless splicing function in accordance with one embodiment of the present invention. The luminaire 100 can be applied to, but is not limited to, use in clean rooms, classrooms in kindergartens, hospital wards, and operating rooms.

Figure 2:
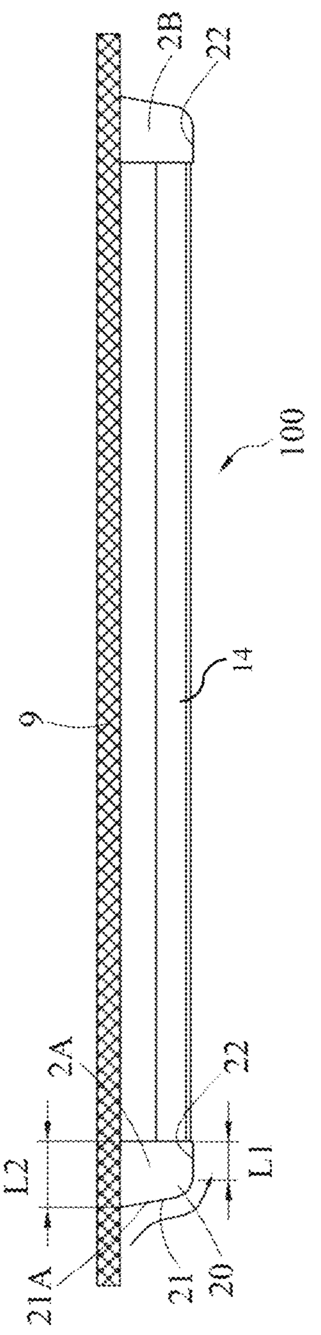
FIG. 2 is the side view of the luminaire with seamless splicing function in accordance with one embodiment of the present invention.
Figure 3:
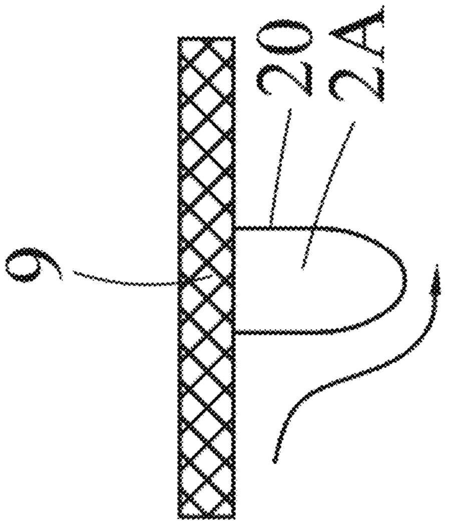
FIG. 3 is the front view of the luminaire with seamless splicing function in accordance with one embodiment of the present invention.
Figure 4:
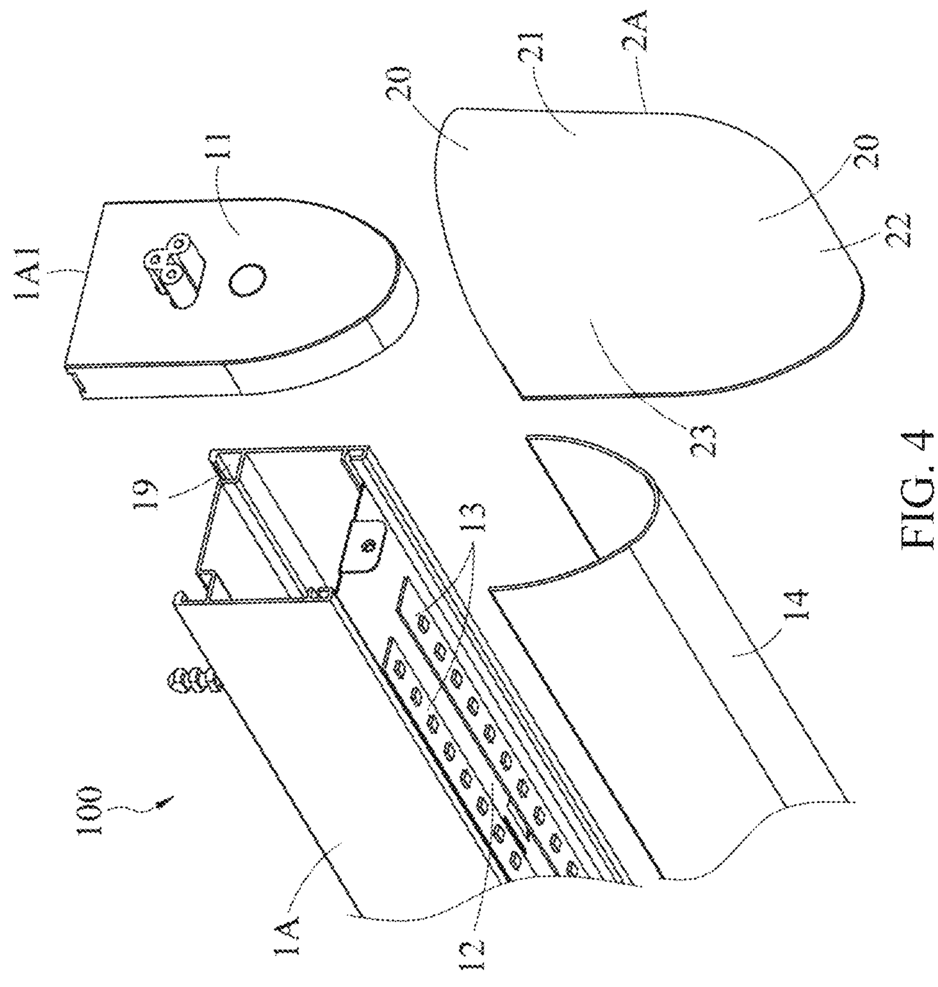
FIG. 4 is the side view of the luminaire with seamless splicing function in accordance with one embodiment of the present invention.

Please refer to FIG. 1 to FIG. 4. FIG. 2 is the side view of the luminaire with seamless splicing function in accordance with one embodiment of the present invention. FIG. 3 is the front view of the luminaire with seamless splicing function in accordance with one embodiment of the present invention. FIG. 4 is the side view of the luminaire with seamless splicing function in accordance with one embodiment of the present invention. The luminaire 100 includes the first lamp body 1A and the end cap 2A. The first lamp body 1A include two jointing portions 1A1 disposed at the two sides thereof respectively. The end cap 2A is connected to one of the jointing portions 1A1. The end cap 2A is a streamlined structure 20. The end cap 2A has a curved side tip 21, a curved bottom tip 22, and two side walls 23. The two side walls 23 are disposed at the two sides of the curved side top and extend to the curved bottom tip 22. The curved side tip 21, curved bottom tip 22, and the two side walls 23 are integrally formed.

Please refer to FIG. 1 to FIG. 3. When the end cap 2A is connected to the jointing portion 1A1 of the first lamp body 1A and the luminaire 100 is installed on the ceiling 9, the streamlined structure 20 of the end cap 2A makes the luminaire 100 be a smooth appearance so as to facilitate the smooth flow of air in clean rooms without any dust. The streamlined structure 20 of the end cap 2A meets the requirements of fluid mechanics, with no protrusions, indentations, gaps, or step differences on its surface, thus not obstructing airflow. When the luminaire 100 is installed on the ceiling 9 of a clean room, there is no need to create openings in the ceiling 9, which avoids high construction costs and prevents the reduction of the mechanical strength of the ceiling 9 and issues such as gaps at the openings.

Please refer to FIG. 1 and FIG. 4. In some embodiments, the first lamp body 1A includes a support portion 12. A light source board 13 is disposed on the support portion 12 and a light cover 14 that covers the light source board 13. The jointing portion 1A1 is a flat plate 11 that covers one side of the first lamp body 1A and one side of the light cover 14. The cross-sectional view of the first lamp body 1A and the light cover 14 resembles a bullet shape, and the lateral projection of the end cap 2A also resembles a bullet shape.

Figure 5:
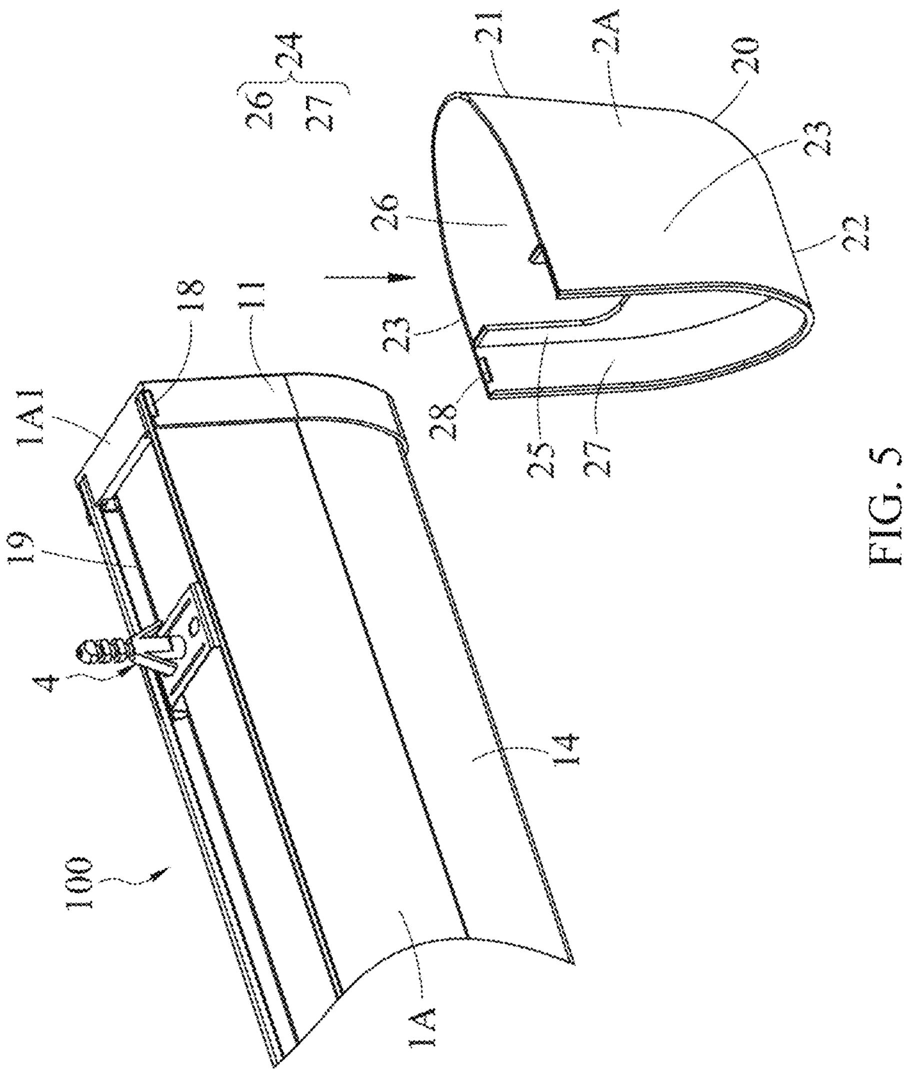
FIG. 5 is the exploded view of a part of the luminaire with seamless splicing function in accordance with one embodiment of the present invention.

Please refer to FIG. 4 and FIG. 5. FIG. 5 is the exploded view of a part of the luminaire with seamless splicing function in accordance with one embodiment of the present invention. FIG. 5 illustrates the state of the end cap of the luminaire being removed. In some embodiments, the end cap 2A has a cavity 24 with a partition 25 inside the cavity 25. The partition 25 divides the cavity 24 into two areas, one large and one small. The partition 25 has a U-shaped appearance. The larger area is the wiring space 26, which provides a space for wiring from the side end of the luminaire 100 through the groove in the partition 25 to the ceiling 9. The smaller area is the accommodating space 27. When the end cap 2A is connected to the jointing portion 1A1 of the first lamp body 1A, the jointing portion 1A1 is disposed inside the accommodating space 27.

Please refer to FIG. 1, FIG. 4, and FIG. 5. In some embodiments, the two sides of the jointing portion 1A1 have buckle slots 18, and the inner sides of the two side walls 23 of the end cap 2A have buckle blocks 28. When the end cap 2A is connected to the jointing portion 1A1 of the first lamp body 1A, each buckle block 28 is engaged with a corresponding buckle slot 18. To remove the end cap 2A from the jointing portion 1A1 of the first lamp body 1A, the end cap 2A can be pulled out in the direction of the arrow shown in FIG. 5, allowing for easy disassembly and maintenance.

In some embodiments, the height-to-width ratio of the first lamp body 1A is approximately 10:6 (in another embodiment, the height-to-width ratio can be, but is not limited to, 9:7 or 11:5), which is conducive to airflow in clean rooms. As shown in FIG. 2 and FIG. 3, air flows smoothly in the direction of the arrow, aiding the air filtration system in removing dust from the environment and maintaining a highly clean environment in the clean room.

Please refer to FIG. 1 and FIG. 2. In some embodiments, the first width L1 of the bottom curved tip 22 of the end cap 2A is less than the second width L2 of the top of the end cap 2A. In some embodiments, the side curved tip 21 is an inclined structure 21A, extending outwardly and obliquely from the bottom curved tip 22.

As shown in FIG. 1, in some embodiments, the luminaire 100 further includes another end cap 2B. The end cap 2B connects to the other of the jointing portions 1A1 of the end cap 2A, enabling the first lamp body 1A to combine with end caps 2A and 2B at the two ends thereof.

Figure 6:
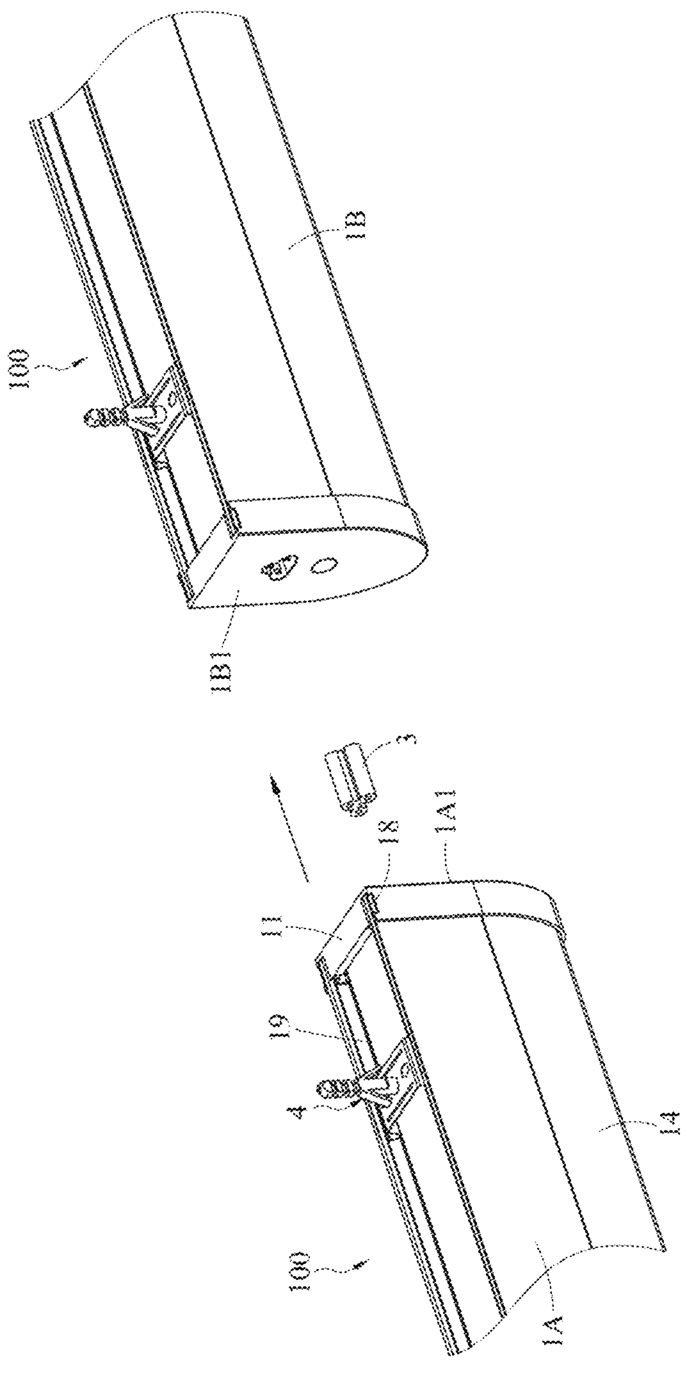
FIG. 6 is the exploded view for illustrating the state of the two lamp bodies not spliced with each other in accordance with one embodiment of the present invention.
Figure 7:
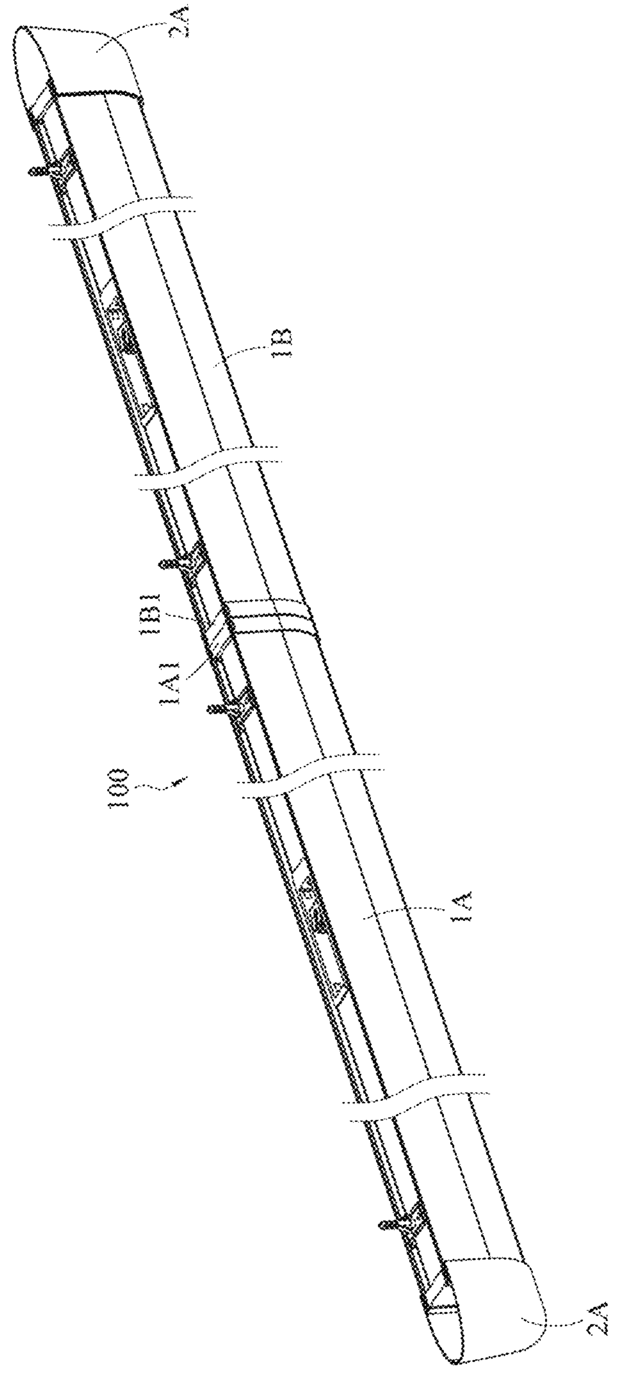
FIG. 7 is the exploded view for illustrating the state of the two lamp bodies spliced with each other in accordance with one embodiment of the present invention.

Please refer to FIG. 6 and FIG. 7. FIG. 6 is the exploded view for illustrating the state of the two lamp bodies not spliced with each other in accordance with one embodiment of the present invention. FIG. 7 is the exploded view for illustrating the state of the two lamp bodies spliced with each other in accordance with one embodiment of the present invention. In some embodiments, the luminaire 100 further includes a second lamp body 1B. The two sides of the second lamp body 1B are provided with two connecting portions 1B1 respectively, and the structure of the second lamp body is the same with that of the first lamp body 1A. The second lamp body 1B can be used alone but is not limited to this use. In some embodiments, the first lamp body 1A and the second lamp body 1B can be spliced with each other (or more than three lamp bodies can be spliced with each other), with the connecting portion 1B1 of the second lamp body 1B connecting to the jointing portion 1A1 of the first lamp body 1A, and the first lamp body 1A and the second lamp body 1B be combined with each other by a connecting element 3. After splicing the first lamp body 1A and the second lamp body 1B with each other, the jointing portion 1A1 of the first lamp body 1A and the connecting portion 1B1 of the second lamp body 1B form a seamless joint, ensuring continuous illumination.

In some embodiments, the streamlined appearance required for clean rooms prevents seamless splicing between luminaires. The use of a detachable end cap and the connecting element enables seamless splicing.

Figure 8:
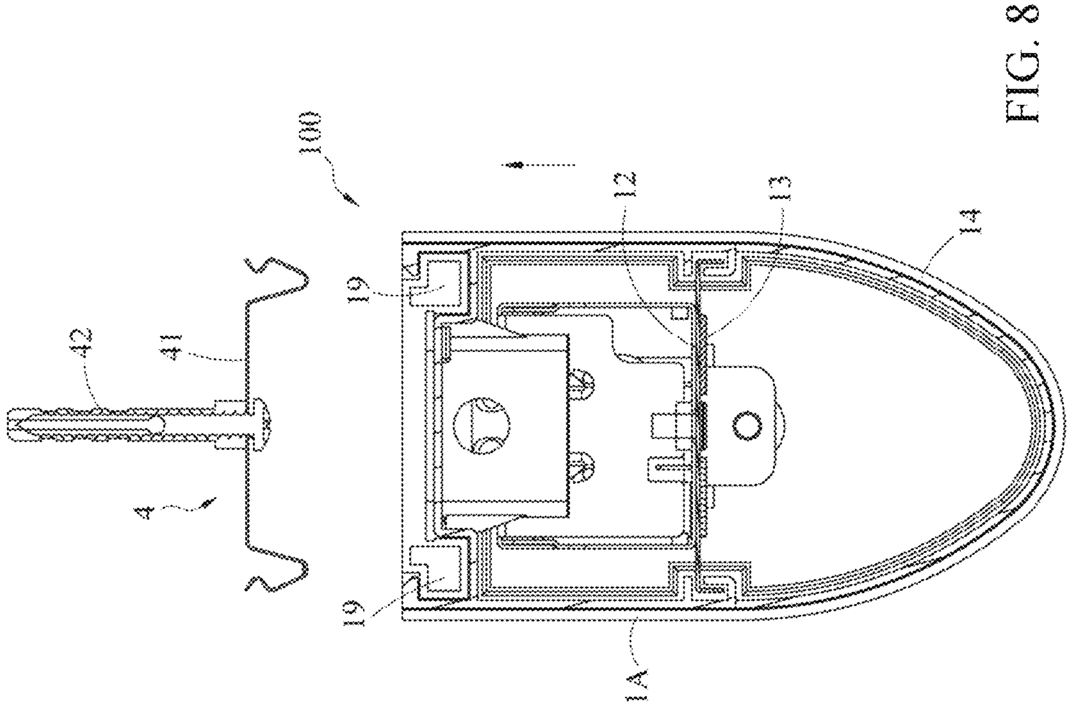
FIG. 8 is the sectional view for illustrating the state before the clip is installed in accordance with one embodiment of the present invention.
Figure 9:
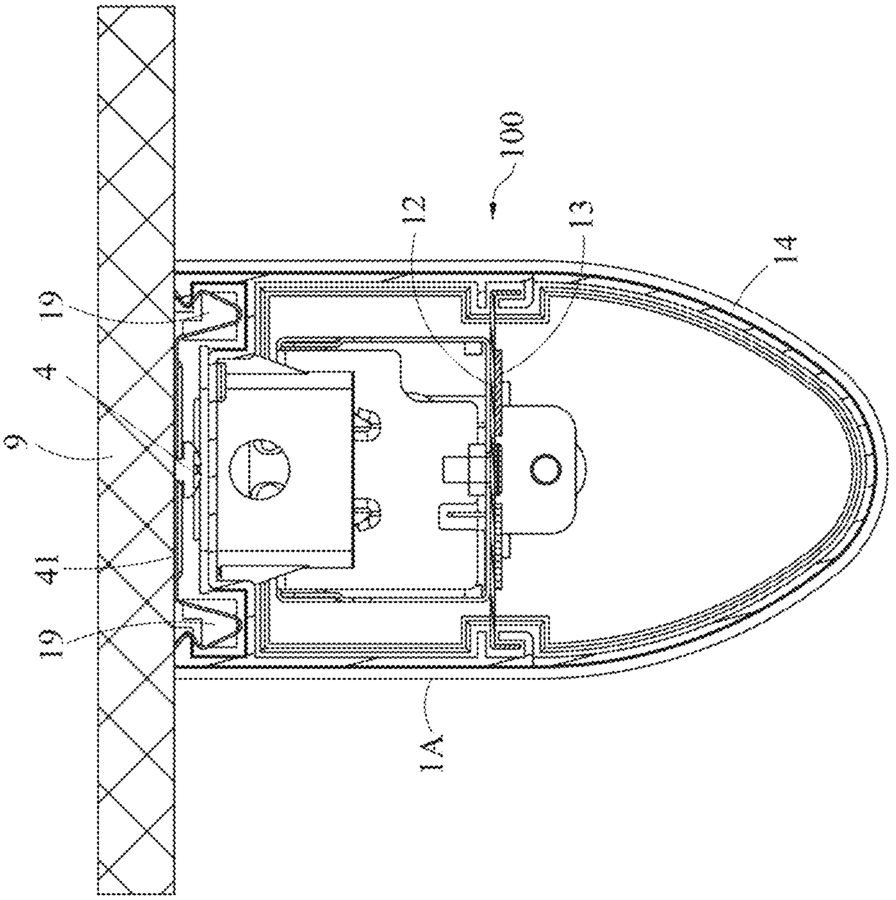
FIG. 9 is the sectional view for illustrating the state before the clip is installed in accordance with one embodiment of the present invention.

Please refer to FIG. 8 and FIG. 9. FIG. 8 is the sectional view for illustrating the state before the clip is installed in accordance with one embodiment of the present invention. FIG. 9 is the sectional view for illustrating the state before the clip is installed in accordance with one embodiment of the present invention. In some embodiments, the luminaire 100 further includes a clip 4, which has a buckle sheet 41 and a locking element 42 disposed on the buckle sheet 41. The top of the first lamp body 1A has a groove 19. When the hooked portions at the two ends of the buckle sheet 41 of the clip 4 engage with the groove 19 on the first lamp body 1A, the buckle sheet 41 snaps into the groove 19, adhering the buckle sheet 41 to the top of the first lamp body 1A. Subsequently, the locking element 42 is fixed to the ceiling 9, ensuring no gap between the luminaire 100 and the ceiling 9 after installation. This enables the luminaire 100 to fit flush against the ceiling 9, presenting a smooth exterior with no seams, reducing dust accumulation. Conventional plastic ceiling lights are installed via external clips, leaving gaps between the luminaire 100 and the ceiling 9, and the sides cannot be made smooth. By using the internal clips 4, the luminaire 100 achieves a seamless fit with the ceiling 9, maintaining smooth sides and reducing dust buildup. The stability of the luminaire 100 is ensured by installing multiple clips 4 on the two sides of the top of the first lamp body 1A to the ceiling 9.

To sum up, according to an embodiment of the present invention, the luminaire with seamless splicing function features a streamlined end cap design, providing a smooth appearance conducive to cleanroom airflow without dust. Additionally, the luminaire's height-to-width ratio of 10:6 facilitates airflow, aiding the air filtration system in removing dust from the environment, thus maintaining high cleanliness in the cleanroom. The detachable end cap also facilitates easy installation and maintenance. Moreover, the seamless splicing between multiple lamp bodies ensures continuous illumination. Finally, the internal clip installation method ensures a seamless fit between the luminaire and the ceiling, maintaining smooth sides and reducing dust accumulation.

Figure 10:
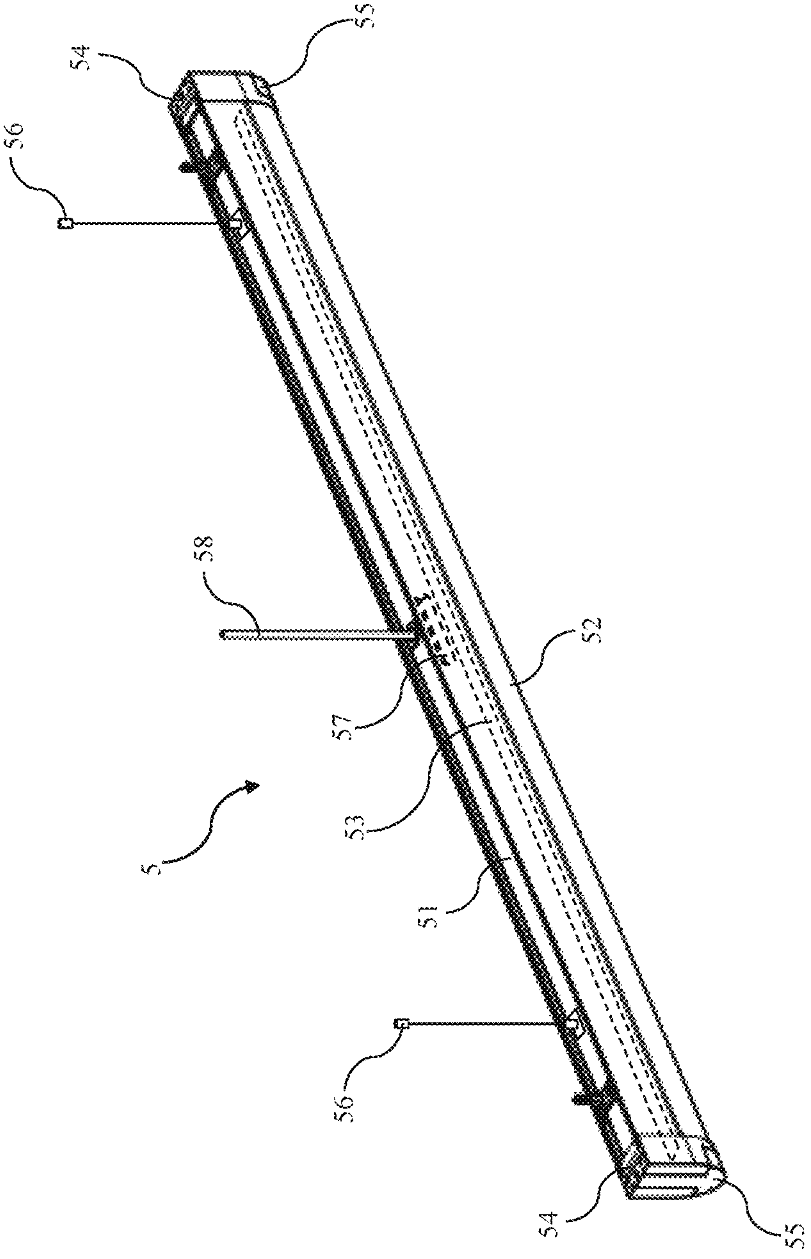
FIG. 10 is the perspective view of the luminaire with seamless splicing function in accordance with another embodiment of the present invention.

Please refer to FIG. 10, which is the perspective view of the luminaire with seamless splicing function in accordance with another embodiment of the present invention. As shown in FIG. 10, the luminaire 5 includes a lamp body 51, a light cover 52, a light source board 53, two end caps 54, two decorative covers 55, a plurality of hanging ropes 56, a power module 57, and a power cable 58.

The light source board 53 is disposed on the lamp body 51. In one embodiment, the light source board 53 includes a circuit board and a plurality of light sources, which can be light-emitting diodes. In one embodiment, the lamp body 51 can be made of metal (such as copper, iron, stainless steel, etc.) or plastic.

The light cover 52 is disposed on the lamp body 51 and covers the light source board 53. In one embodiment, the light cover 52 can be made of transparent or semi-transparent materials, such as glass or plastic.

The two end caps 54 are disposed at the two ends of the lamp body 51.

The two decorative covers 55 correspond to the two end caps 54 and are installed on the two end caps 54.

The power module 57 is disposed inside the lamp body 51 and is electrically connected to the light source board 53. The power module 57 is connected to an external power source (such as utility power) through the power cable 58. In one embodiment, the power module 57 can be a light-emitting diode driver.

One end of each hanging rope 56 is connected to the lamp body 51, and the other end is fixed to the ceiling, allowing the luminaire 5 to be suspended from the ceiling. In the embodiment, the number of the hanging ropes 56 is two, but it can vary according to actual needs.

The embodiment just exemplifies the present invention and is not intended to limit the scope of the present invention; any equivalent modification and variation according to the spirit of the present invention is to be also included within the scope of the following claims and their equivalents.

Figure 11:
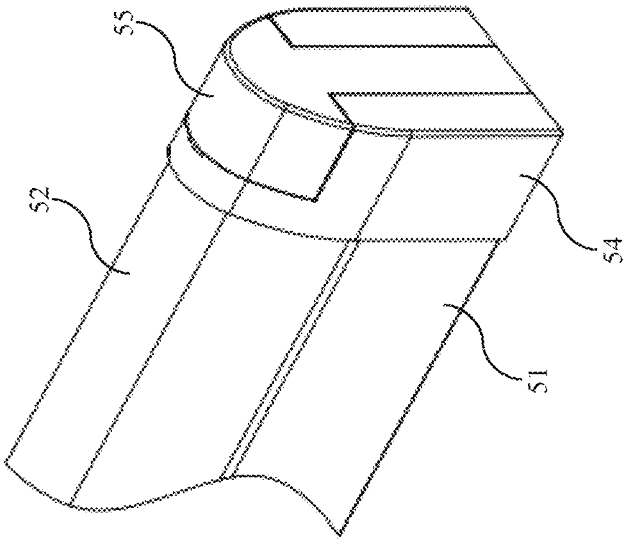
FIG. 11 is the assembly view of the end cap and decorative cover of the luminaire with seamless splicing function in accordance with another embodiment of the present invention.
Figure 12:
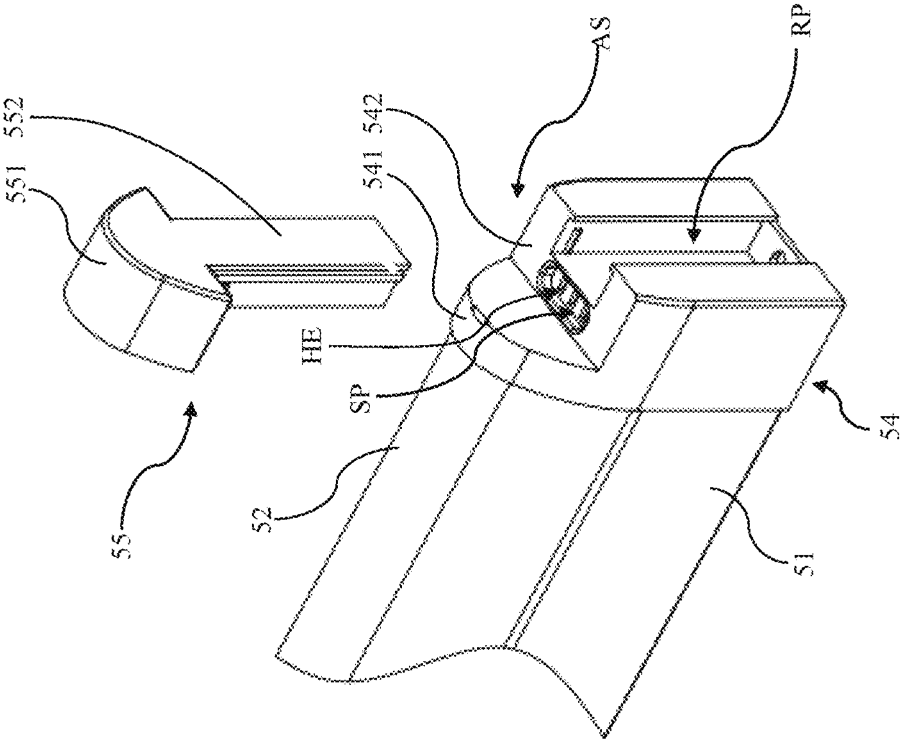
FIG. 12 is the exploded view of the end cap and decorative cover of the luminaire with seamless splicing function in accordance with another embodiment of the present invention.
Figure 13:
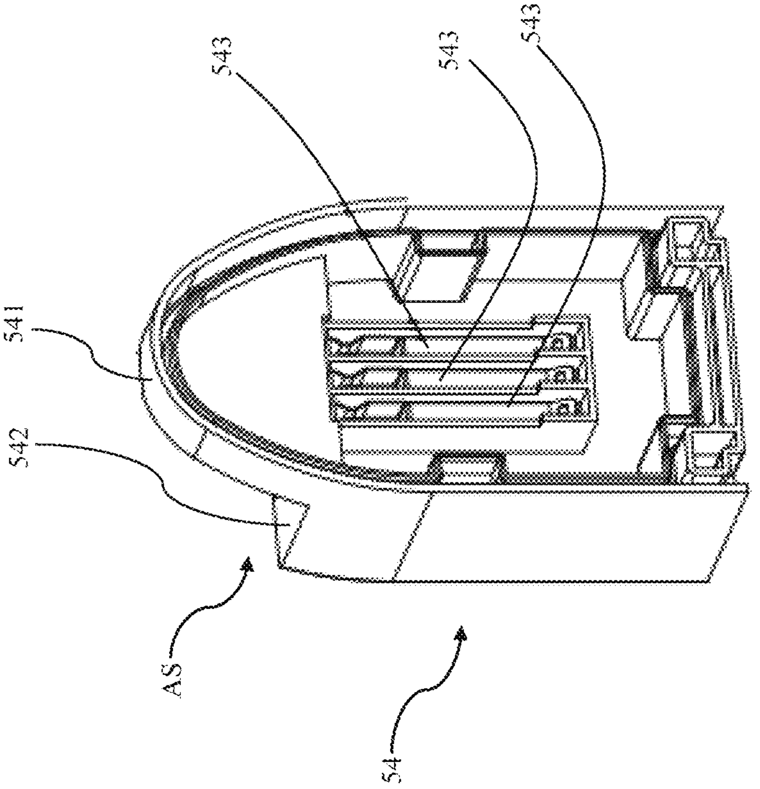
FIG. 13 is the schematic view of the inner structure of the end cap of the luminaire with seamless splicing function in accordance with another embodiment of the present invention.

Please refer to FIG. 11, FIG. 12, and FIG. 13. FIG. 11 is the assembly view of the end cap and decorative cover of the luminaire with seamless splicing function in accordance with another embodiment of the present invention. FIG. 12 is the exploded view of the end cap and decorative cover of the luminaire with seamless splicing function in accordance with another embodiment of the present invention. FIG. 13 is the schematic view of the inner structure of the end cap of the luminaire with seamless splicing function in accordance with another embodiment of the present invention. As shown in FIG. 11, FIG. 12, and FIG. 13., each end cap 54 has an end cap body 541, a protruding portion 542, and a plurality of elastic metal sheets 543. In this embodiment, the number of the elastic metal sheets 543 is three, but it can vary according to actual needs. The protruding portion 542 has a recess RP and an accommodating groove SP, and is connected to the end cap body 541. The accommodating groove SP has a plurality of connection holes HE. In this embodiment, the number of the connection holes HE is three, but it can vary according to actual needs. The height of the protruding portion 542 is lower than the height of the end cap body 541, forming a stepped structure. Thus, an accommodating space AS is formed between one end of the protruding portion 542 and the end cap body 541.

The elastic metal sheets 543 are disposed inside the protruding portion 542 to electrically connect to the light source board 53. The elastic metal sheets 543 can be made of copper, iron, or other similar materials.

The two decorative covers 55 correspond to the two end caps 54. Each decorative cover 55 has a head portion 551 and a columnar portion 552. The columnar portion 552 is inserted into the corresponding recess RP of the end cap 54, while the head portion 551 fills the corresponding accommodating space AS of the end cap 54.

The embodiment just exemplifies the present invention and is not intended to limit the scope of the present invention; any equivalent modification and variation according to the spirit of the present invention is to be also included within the scope of the following claims and their equivalents.

Figure 14:
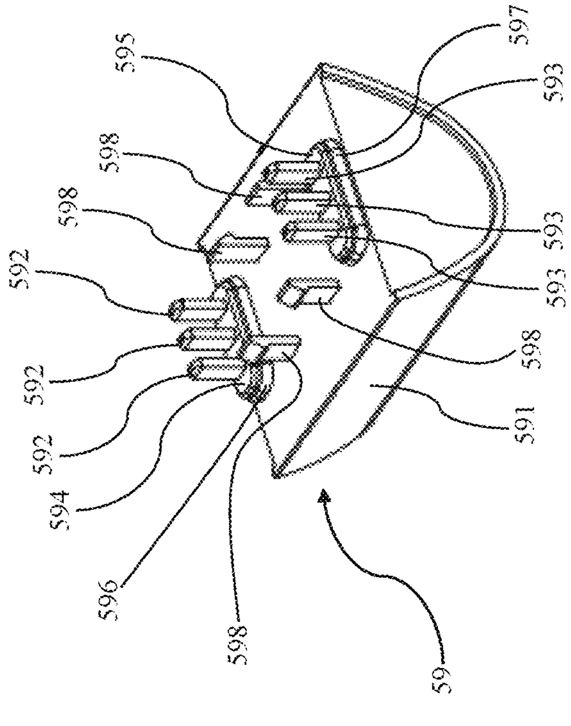
FIG. 14 is the perspective view of electrical connection cover of the luminaire with seamless splicing function in accordance with another embodiment of the present invention.
Figure 15:
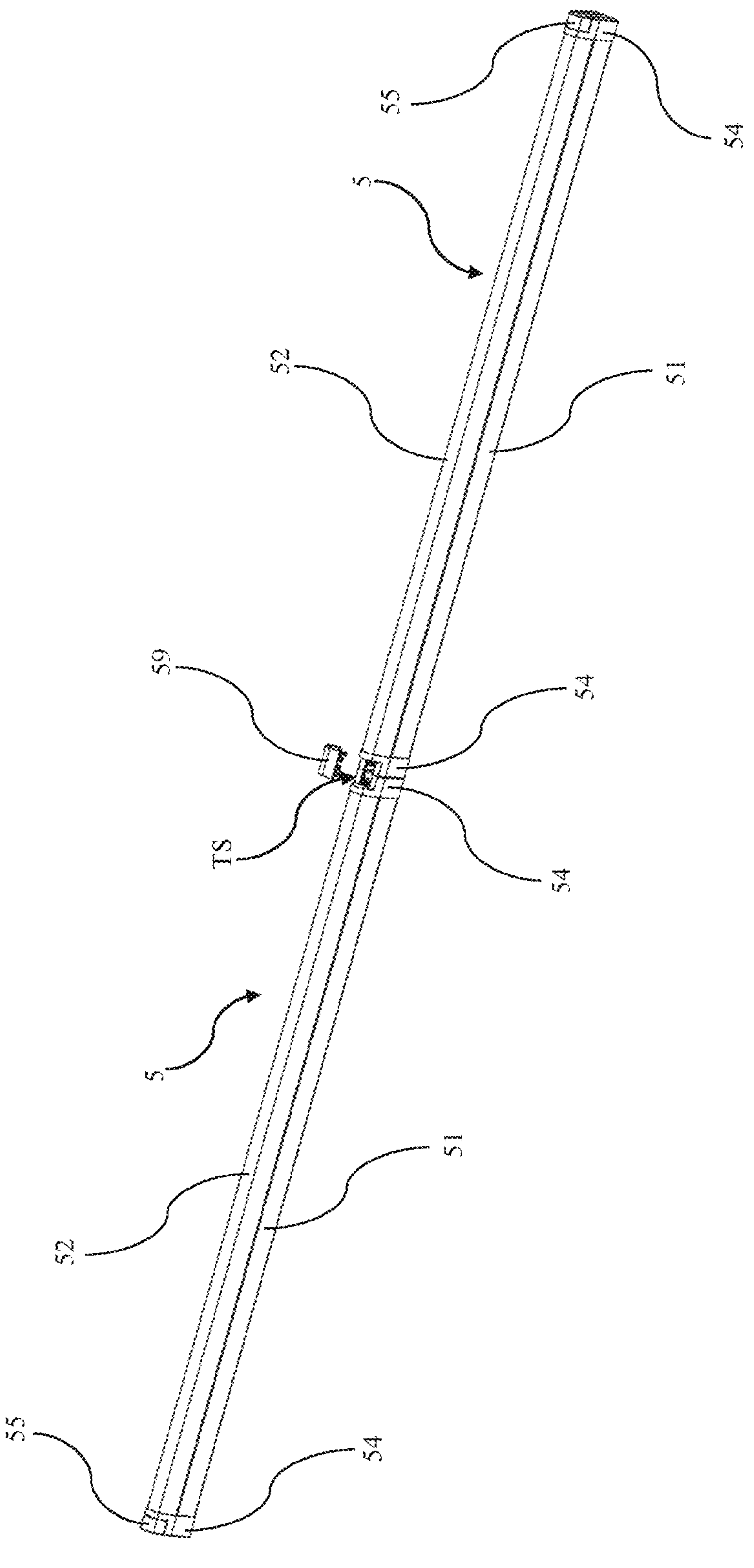
FIG. 15 is the schematic view of the two luminaires spliced with each other in accordance with another embodiment of the present invention.
Figure 16:
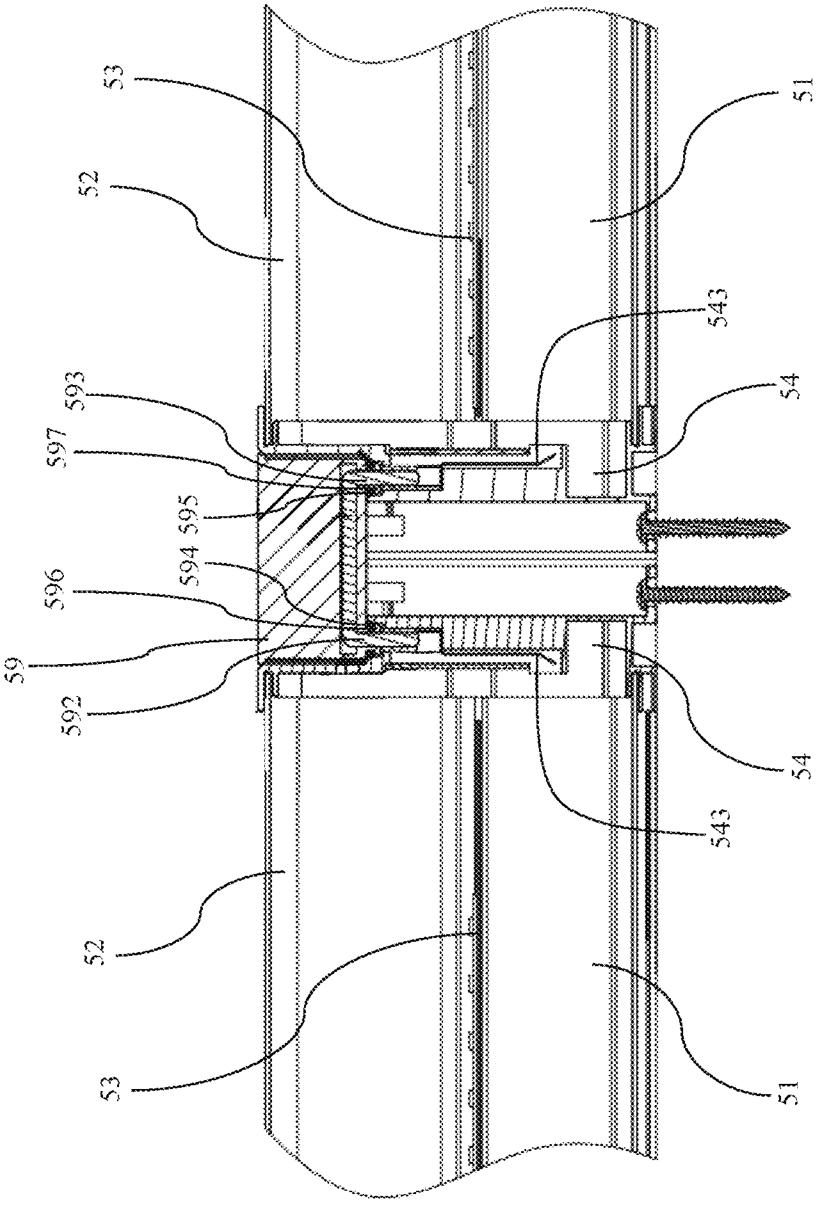
FIG. 16 is the sectional view of the two luminaires spliced with each other in accordance with another embodiment of the present invention.

Please refer to FIG. 14, FIG. 15 and FIG. 16. FIG. 14 is the perspective view of electrical connection cover of the luminaire with seamless splicing function in accordance with another embodiment of the present invention. FIG. 15 is the schematic view of the two luminaires spliced with each other in accordance with another embodiment of the present invention. FIG. 16 is the sectional view of the two luminaires spliced with each other in accordance with another embodiment of the present invention. As shown FIG. 14, FIG. 15 and FIG. 16, the luminaire 5 further includes an electrical connection cover 59.

The electrical connection cover 59 has a cover body 591, a plurality of first metal pins 592, a plurality of second metal pins 593, a first protruding block 594, a second protruding block 595, a first waterproof ring 596, a second waterproof ring 597, and a plurality of hook portions 598. The first protruding block 594 is disposed at one end of the surface of the cover body 591, while the second protruding block 595 is disposed at the other end of the surface of the cover body 591. The first metal pins 592 are disposed on the first protruding block 594. The second metal pins 593 are disposed on the second protruding block 595 and are electrically connected to the first metal pins 592. The first waterproof ring 596 is sleeved on the first protruding block 594, while the second waterproof ring 597 is sleeved on the second protruding block 595. The hook portions 598 are disposed on the surface of the cover body 591. In this embodiment, the number of first metal pins 592 is three, but it can vary according to actual needs. In this embodiment, the number of second metal pins 593 is three, but it can vary according to actual needs. In this embodiment, the number of hook portions 598 is three, but it can vary according to actual needs. In this embodiment, the number of hook portions 598 is four, but it can vary according to actual needs.

When the decorative cover 55 on any end cap 54 is removed, the user can connect this end cap 54 to one of the end caps 54 of another luminaire 5 (the decorative cover 55 on the end cap 54 of another luminaire 5 is also removed).

This allows the accommodating space AS of the end cap 54 of luminaire 5 to combine with the accommodating space AS of the end cap 54 of another luminaire 5 to form a combined space TS. The electrical connection cover 59 can be disposed in the combined space TS, with the first metal pins 592 inserted into the connection holes HE of the end cap 54 of the luminaire 5, making an electrical connection with the elastic metal sheets 543 of this end cap 54. Similarly, the second metal pins 593 are inserted into the connection holes HE of one end cap 54 of another luminaire 5, making an electrical connection with the elastic metal sheets 543 of this end cap 54. Meanwhile, the first protruding block 594 and the first waterproof ring 596 can fill the corresponding accommodating groove SP of the end cap 54, and the second protruding block 595 and the second waterproof ring 597 can also fill the corresponding accommodating groove SP of the end cap 54. The electrical connection cover 59 is secured to both end caps 54 through the hook portions 598.

Through the above structural design, two luminaires 5 can achieve seamless splicing, ensuring no gaps at the junction and maintaining continuous illumination.

Additionally, the end cap 54 is also a streamlined structure, giving it a smooth appearance, which facilitates the smooth flow of air in a cleanroom and eliminates dust accumulation. The height-to-width ratio of the luminaire 5 is 10:6, which promotes air circulation in the cleanroom, aiding the air filtration system in removing dust from the environment and maintaining a highly clean environment.

Furthermore, the first protruding block 594 and the first waterproof ring 596 of the electrical connection cover 59 can fill the corresponding accommodating groove SP of the end cap 54, and the second protruding block 595 and the second waterproof ring 597 can also fill the corresponding accommodating groove SP of the end cap 54. The elastic metal sheets 543 of each end cap 54 are disposed inside the protruding portion 542 thereof, significantly enhancing the waterproof performance of the luminaire 5.

The embodiment just exemplifies the present invention and is not intended to limit the scope of the present invention; any equivalent modification and variation according to the spirit of the present invention is to be also included within the scope of the following claims and their equivalents.

It will be apparent to those skilled in the art that various modifications and variations can be made to the disclosed embodiments. It is intended that the specification and examples be considered as exemplary only, with a true scope of the present invention being indicated by the following claims and their equivalents.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A luminaire with seamless splicing function, comprising:

a lamp body;

a light source board disposed on the lamp body; and an end cap disposed at one end of the lamp body, wherein the end cap has an end cap body, a protruding portion, and a plurality of elastic metal sheets, and the protruding portion has a recess and an accommodating groove having a plurality of connection holes, and is connected to the end cap body, wherein the elastic metal sheets are disposed inside the protruding portion and electrically connected to the light source board, and the elastic metal sheets are exposed from the connection holes respectively;

an electrical connection cover comprising a cover body, a plurality of first metal pins, a plurality of second metal pins, a first protruding block, a second protruding block and a first waterproof ring, wherein the first protruding block is disposed at one end of a surface of the cover body, and the second protruding block is disposed at another end of the surface of the cover body, wherein the first metal pins are disposed on the first protruding block, and the second metal pins are disposed on the second protruding block and are electrically connected to the first metal pins, wherein the first waterproof ring is sleeved on the first protruding block;

wherein a height of the protruding portion is lower than a height of the end cap body to form a stepped structure, whereby an accommodating space is formed between one end of the protruding portion and the end cap body, wherein the electrical connection cover combines the end cap with an end cap of another luminaire, and the accommodating space of the end cap and an accommodating space of the end cap of the another luminaire form a combined space, and the electrical connection cover is be disposed in the combined space to fill the combined space, and the first metal pins are inserted into the connection holes of the end cap to electrically connect to the elastic metal sheets, wherein the first protruding block and the first waterproof ring fill the accommodating groove of the end cap, and the second metal pins electrically connect to elastic metal sheets of the end cap of the another luminaire.

2. The luminaire with seamless splicing function as claimed in claim 1, further comprising a light cover disposed on the lamp body and covering the light source board.

3. The luminaire with seamless splicing function as claimed in claim 1, wherein a height-to-width ratio of the first lamp body is 10:6.

4. The luminaire with seamless splicing function as claimed in claim 1, further comprising another end cap disposed at another end of the lamp body.

* * * * *